US010095950B2

(12) United States Patent
Krishnakumar et al.

(10) Patent No.: US 10,095,950 B2
(45) Date of Patent: Oct. 9, 2018

(54) SYSTEMS AND METHODS FOR IMAGE PROCESSING

(71) Applicant: HYPERVERGE INC., Palo Alto, CA (US)

(72) Inventors: Vignesh Krishnakumar, Palo Alto, CA (US); Hariprasad Prayagai Sridharasingan, Palo Alto, CA (US); Adarsh Amarendra Tadimari, Palo Alto, CA (US); Saivenkatesh A, Palo Alto, CA (US)

(73) Assignee: HYPERVERGE INC., Palo Alto, CA (US)

(*) Notice: Subject to any disclaimer, the term of this patent is extended or adjusted under 35 U.S.C. 154(b) by 0 days.

(21) Appl. No.: 15/172,139

(22) Filed: Jun. 2, 2016

(65) Prior Publication Data

US 2016/0358024 A1 Dec. 8, 2016

Related U.S. Application Data

(60) Provisional application No. 62/170,451, filed on Jun. 3, 2015.

(51) Int. Cl.
*G06K 9/00* (2006.01)
*G06K 9/46* (2006.01)
*G06K 9/62* (2006.01)
*G06K 9/66* (2006.01)

(52) U.S. Cl.
CPC ....... *G06K 9/4628* (2013.01); *G06K 9/00624* (2013.01); *G06K 9/6232* (2013.01); *G06K 9/66* (2013.01)

(58) Field of Classification Search
CPC ............ G06K 9/6292; G06K 9/6293; G06K 9/00664; G06K 9/00684; G06K 9/00691; G06K 9/00697; G06K 9/66; G06K 9/6232; G06K 9/4619; G06K 9/6277; G06K 9/4671; G06K 9/4609; G06K 9/6262; G06K 9/00624–9/00704; G06K 9/00771–9/00845; G06K 9/4628
USPC .......................... 382/156, 158, 181, 224, 155
See application file for complete search history.

(56) References Cited

U.S. PATENT DOCUMENTS

| 8,644,624 B2* | 2/2014 | Tao ..................... G06K 9/00684 |
| | | 382/155 |
| 2012/0141017 A1* | 6/2012 | Krupka .............. G06K 9/00228 |
| | | 382/159 |
| 2016/0259994 A1* | 9/2016 | Ravindran ............... G06K 9/00 |

OTHER PUBLICATIONS

Sharif Razavian, Ali, et al. "CNN features off-the-shelf: an astounding baseline for recognition." Proceedings of the IEEE conference on computer vision and pattern recognition workshops. 2014.*
Lee, Chen-Yu, et al. "Deeply-supervised nets." Artificial Intelligence and Statistics. 2015.*
(Continued)

*Primary Examiner* — Geoffrey E Summers
(74) *Attorney, Agent, or Firm* — Ladas & Parry, LLP (57) ABSTRACT

Efficient image processing systems and methods for image scene classification and similarity matching are disclosed. The image processing systems encompassed by this disclosure use a deep convolutional neural network to facilitate scene classification by recognizing the context of an image and thereby enabling searches for similar images. These methods and systems are scalable to a large set of images and achieve a higher performance compared to the current state of the art techniques.

9 Claims, 7 Drawing Sheets

(56) References Cited

OTHER PUBLICATIONS

Donahue, Jeff, et al. "Decaf: A deep convolutional activation feature for generic visual recognition." International conference on machine learning. 2014.*

Koskela, Markus, and Jorma Laaksonen. "Convolutional network features for scene recognition." Proceedings of the 22nd ACM international conference on Multimedia. ACM, 2014.*

Zhou, Bolei, et al. "Learning deep features for scene recognition using places database." Advances in neural information processing systems. 2014.*

Leverington, David. "A Basic Introduction to Feedforward Backpropagation Neural Networks." Department of Geosciences, Texas Tech University, Jul. 1, 2010.*

Niu, Xiao-Xiao, and Ching Y. Suen. "A novel hybrid CNN-SVM classifier for recognizing handwritten digits." Pattern Recognition 45.4 (2012): 1318-1325.*

Krizhevsky, Alex, Ilya Sutskever, and Geoffrey E. Hinton. "Imagenet classification with deep convolutional neural networks." Advances in neural information processing systems. 2012.*

Sermanet, Pierre, et al. "Overfeat: Integrated recognition, localization and detection using convolutional networks." arXiv preprint arXiv:1312.6229 (2013).*

Tang, Yichuan. "Deep learning using linear support vector machines." arXiv preprint arXiv:1306.0239 (2013).*

* cited by examiner

| Indoor | Outdoor-manmade | Outdoor-natural |
|---|---|---|
| Bowling | Temple | River |
| Mall | Bazaar | Desert |
| Apparel Store | Sports | Mountain |
| Indoor Sport | Highway | Flora |
| Locker Room | Stadium | Cave |
| Office | Pool | Sea |
| Bar | Street | Beach |
| Restaurant | Amusement park | Forest |
| Casino | Urban | Snow |
| Theater | Travel | Landscape |
| House | Monument | |
| Disco | | |
| Store | | |
| Library | | |

SYSTEMS AND METHODS FOR IMAGE PROCESSING

CROSS-REFERENCE TO RELATED APPLICATION(S)

This application claims the benefit to U.S. Provisional Patent Application No. 62/170,451 filed on Jun. 3, 2015 in the United States Patent and Trademark Office, the disclosure of which is incorporated herein by reference in its entirety.

FIELD OF THE INVENTION

The present invention relates to image processing systems and methods and more particularly to systems and methods for image scene classification and similarity matching.

BACKGROUND

The following description of related art is intended to provide background information pertaining to the field of the invention. This section may include certain aspects of the art that may be related to various aspects of the present disclosure. However, it should be appreciated that this section be used only to enhance the understanding of the reader with respect to the present disclosure, and not as admissions of prior art.

Image processing is widely gaining popularity with the increasing usage of digital images for various purposes. Particularly, one of the most important areas in image processing relates to scene classification that deals with the problem of understanding the context of what is captured in an image. Understanding a holistic view of an image is a relatively difficult task due to the lack of text labels that represent the content present in them. Existing systems and methods for scene recognition have a number of drawbacks and limitations. Existing solutions treat indoor and outdoor scene recognition as two different problems due to the significant variation in appearance characteristics between indoor and outdoor images. It has largely been perceived that different kinds of features would be required to discriminate between indoor scenes and outdoor scenes. This is highly inefficient since different systems and methods are required to be deployed for scene recognition of indoor and outdoor scenes. Current indoor scene recognition systems and methods use part-based models that look for characteristic objects in an image to determine the scene which results in the inaccurate assumption that similar-looking objects distributed spatially in a similar manner, constitute the same scene.

Further, the current solutions are unable to effectively address the problem of overfitting caused by the use of real world image datasets (as input to these systems) that capture a lot of intra-class variation, i.e. the significant variation in appearance characteristics of images within each class. Furthermore, existing solutions use hand crafted features to discriminate between images/scenes. However, features that are good for discriminating between some classes may not be good for other classes. Existing approaches to image/scene recognition are incapable of continuously learning from or adapting to the increasing number of images uploaded to the Internet every day.

Another important aspect of image processing relates to similarity matching of images. With the growing requirement for image recognition technologies, the need for scalable recognition techniques that can handle a large number of classes and continuously learn from Internet scale images has become very evident. Unlike searching for textual data, searching for images similar to a particular image is a challenging task. The number of images uploaded on the World Wide Web is increasing every day and it has become extremely difficult to incorporate these newly added images into the search database of existing similarity matching techniques. As discussed above, existing image recognition solutions use hand crafted features to discriminate between images. A major disadvantage of such systems is that it results in a large reconstruction error, i.e. reconstruction of images using these hand crafted features is likely to produce an image very different from the original image.

Thus, there is a need for building improved and scalable image processing systems for scene classification and similarity matching that are capable of handling a large number of images/classes.

SUMMARY

This section is provided to introduce certain objects and aspects of the disclosed methods and systems in a simplified form that are further described below in the detailed description. This summary is not intended to identify the key features or the scope of the claimed subject matter.

In view of the shortcomings of existing image processing systems and methods, as discussed in the background section, it is an object of the present invention to provide systems and methods for image processing that facilitates scene recognition while minimizing the false positives. It is another object of the present invention to facilitate large scale recognition of indoor and outdoor scenes. Another object of the invention is to provide systems and methods for scene classification that helps in achieving translational invariance. Yet another object of the invention is to provide image processing systems and methods that efficiently provides images similar to a query image. Another object of the invention is to facilitate similarity matching that minimizes reconstruction error.

In view of these and other objects, one aspect of the present disclosure relates to a method for scene classification for an image. The method begins with receiving at least one image and classifying said image into at least one category using a deep convolutional neural network (DCNN), wherein the DCNN determines at least one intermediate output category for said image and extracts one or more characteristic features of said image. The method further comprises validating the at least one intermediate output category based on said extracted characteristic features and providing a scene classification based on said validation.

Another aspect of the invention relates to a system for scene classification of an image, the system comprising a receiver unit for receiving at least one image for classification and a base classifier, associated with said receiver unit, wherein the base classifier comprises a deep convolutional neural network (DCNN), and wherein the DCNN determines at least one intermediate output category for said image and extracts one or more characteristic features of said image. The system further comprises a binary classifier associated with said base classifier, for providing a scene classification for said at least one image based on validation of the at least one intermediate output category, wherein said validation is based on said extracted characteristic features.

Yet another aspect of the disclosure relates to a method for providing images similar to a query image from within a set of images. The method comprises receiving a query image from the user and providing said query image as an input to a deep convolutional neural network (DCNN), wherein the DCNN extracts a feature vector of said query image. The method further comprises reducing the dimensionality of the extracted feature vector to form a reduced dimensional feature vector and subsequently splitting the reduced dimensional feature vector into a plurality of query feature segments. Lastly, each of said query image segments are compared with segments of the set of images and images similar to said query image is provided based on this comparison.

Yet another aspect of the invention relates to a system for providing images similar to a query image from within a set of images. The system comprises an input module for receiving a query image from the user and a base classifier associated with said input module, wherein the base classifier comprises a deep convolutional neural network (DCNN), and wherein the DCNN extracts a feature vector of said query image. The system further comprises a reduction module associated with said base classifier, for reducing dimensionality of said feature vector to form a reduced dimensional feature vector and splitting the reduced dimensional feature vector into a plurality of query image segments. The system also comprises a comparison module associated with said reduction module, for providing images similar to said query image, based on a comparison between each of said query image segments and segments of the set of images.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Some drawings may indicate the components using block diagrams. It will be appreciated that disclosure of such block diagrams include disclosure of the internal sub-components of these components as discussed in the detailed description.

The foregoing will be apparent from the following more detailed description of example embodiments of the present disclosure, as illustrated in the accompanying drawings.

DETAILED DESCRIPTION OF EXEMPLARY EMBODIMENTS OF THE INVENTION

In the following description, for the purposes of explanation, various specific details are set forth in order to provide a thorough understanding of the disclosed embodiments. It will be apparent, however, that the disclosed embodiments may be practiced without these specific details. Several features described hereafter can each be used independently of one another or with any combination of other features. Although headings are provided, information related to a particular heading, but not found in the section having that heading, may also be found elsewhere in the specification. Further, information provided under a particular heading may not necessarily be a part of only the section having that heading.

System Overview

Figure 1:
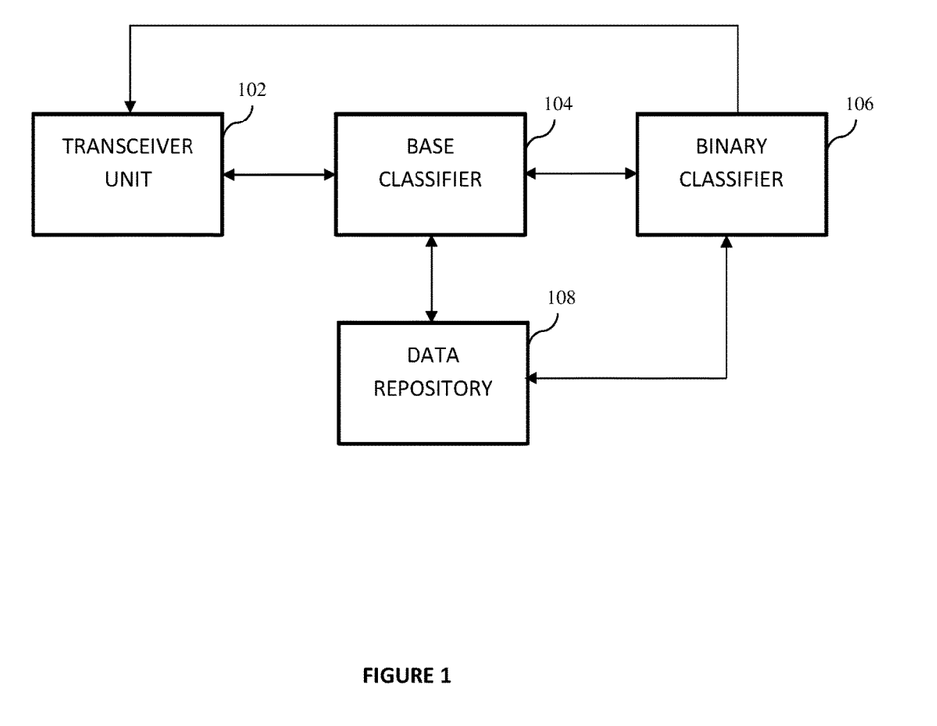
FIG. 1 illustrates a block diagram of a system for scene classification, in accordance with exemplary embodiments of the present invention.

Systems and methods for image processing in accordance with example embodiments of the present disclosure are described. In general, the systems and methods disclosed herein facilitate scene classification and similarity matching for an image. As shown in FIG. 1, the system for scene classification, in accordance with example embodiments of the present disclosure, comprises of a transceiver unit 102 associated with a base classifier 104 and a binary classifier 106, all connected to a data repository 108. The transceiver unit 102 is configured to receive at least one image for classification, wherein the image may be received from a user or any other system. The transceiver unit 102 is configured to pre-process this information and provide it to the base classifier 104.

The base classifier 104 comprises of a deep convolutional neural network (DCNN), wherein the DCNN is configured to determine at least one intermediate output category for said image and extract one or more characteristic features thereof. The intermediate output category may be chosen from a set of pre-defined output categories. The intermediate output category determined by the DCNN is one of an indoor category, an outdoor category and a combination thereof. In an embodiment, the extracted one or more characteristic features may be the output feature vector produced by the first fully connected layer of the DCNN. The DCNN is a large neural network configured to deal with two dimensional input data such as an image and perform 2D convolutional operation on such input. The DCNN has been discussed in detail with reference to FIG. 3.

The binary classifier 106 associated with said base classifier 104 is configured to validate the intermediate output category provided by the base classifier based on the extracted characteristic features of an image and provide a scene classification for the image based on said validation. The invention encompasses a binary classifier capable of predicting that the image does not belong to any scene classification. The invention encompasses a binary classifier capable of predicting more than one scene category/classification to an image received from the user. In a preferred embodiment, the system comprises of one binary classifier for each of the intermediate output categories pre-defined in the system. The invention encompasses a binary classifier that is a Support Vector Machine (SVM).

The data repository 108 is configured to store the intermediate output category and the extracted characteristic features of the image received from the base classifier 104. The data repository 108 is further configured to store the scene classification provided by the binary classifier 106.

Figure 2:
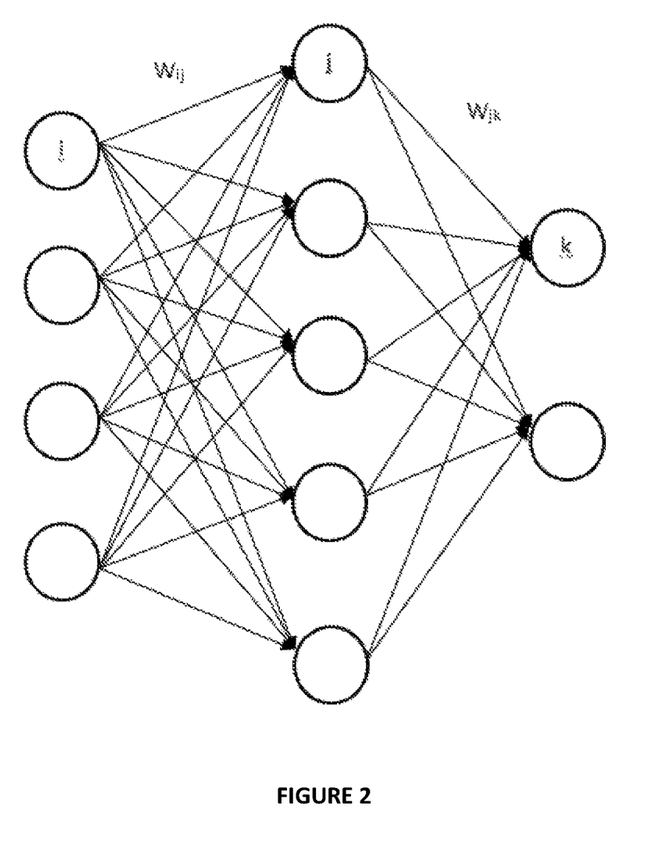
FIG. 2 illustrates a general example of a neural network.

FIG. 2 illustrates a simplified example of an artificial neural network comprising of multiple nodes and connections between them. The nodes 202 (*i*) are referred to as input nodes and are configured to receive raw data in the form of inputs that trigger the nodes it is connected to. Each connection as shown in FIG. 2 has a corresponding value referred to as weights, wherein these weights may indicate the importance of these connections/nodes. In an embodiment, when a node is triggered by two or more nodes, the input taken by the node depends upon the weight of the connections from which the node is triggered. The nodes 204 (j) are referred to as intermediate/hidden nodes and are configured to accept input from one or more input nodes and provide output to one or more hidden nodes and/or output nodes 206 (k). The input nodes 202 (i) form an input layer, the hidden nodes 204 (j) form one or more hidden layers and the output nodes 206 (k) form an output layer. Although only one hidden layer has been shown in FIG. 2, it will be appreciated that any number of hidden layers may be implemented in the artificial neural network depending upon the complexity of the decision to be made, the dimensionality of the input data and size of the dataset used for training. In a deep neural network, large number of hidden layers are stacked one above the other, wherein each layer computes a non-linear transformation of the outputs from the previous layer.

To facilitate generation/prediction of outputs with minimal error, the deep neural network are required to be trained or customized, wherein a large set of inputs are provided to the neural network, outputs for said inputs are computed and the network weights are adjusted based on the error, if any, in the outputs. In an embodiment, the training of neural networks encompasses by the invention is performed using backpropagation, wherein random weights/values are assigned to each connection followed by computing a set of outputs for a given set of inputs using said random weights. A desired output of each of the inputs is defined and is compared with the calculated output, wherein the difference between the two values may be referred to as an error in the network. Subsequently, weights for each layer are adjusted based on the computed error for each layer. Thus, using this method of backpropagation a network can be appropriately trained to minimize errors in the output.

Figure 3:
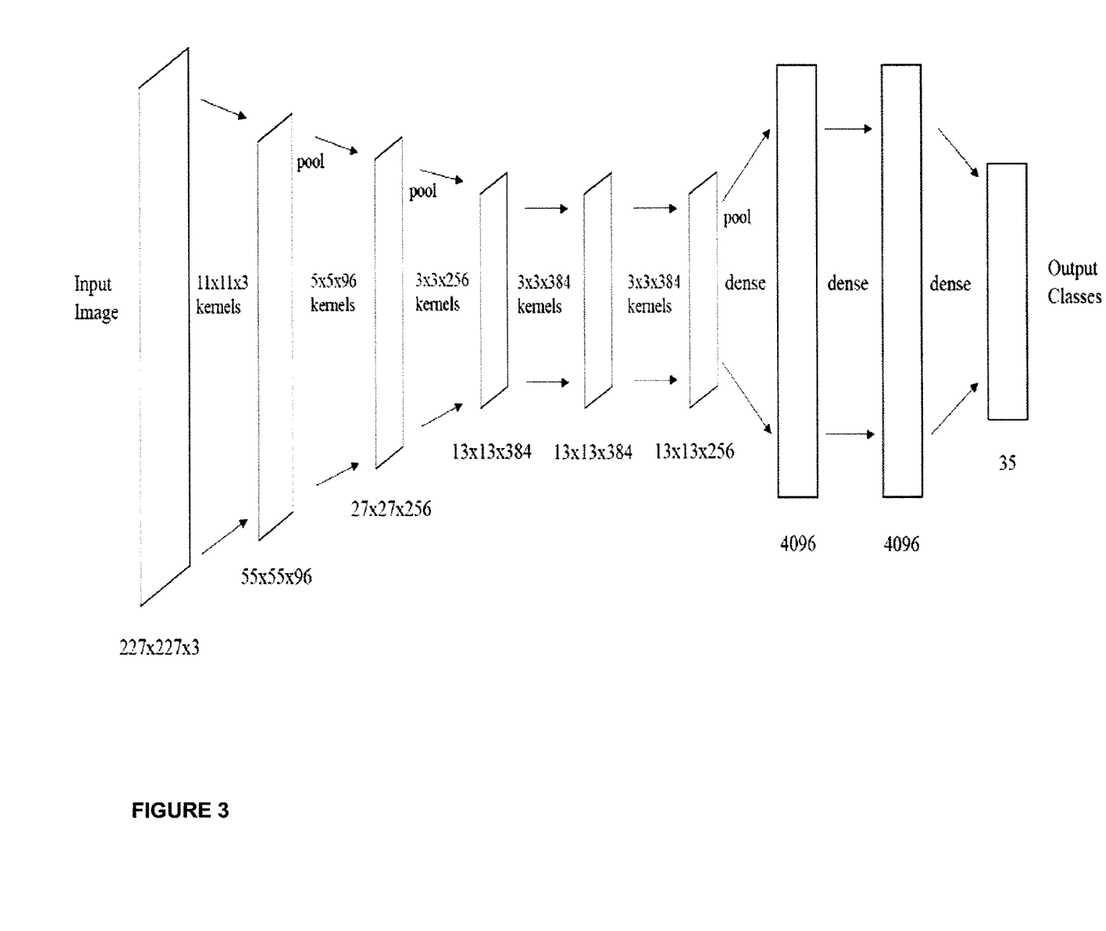
FIG. 3 illustrates an architectural representation of the configuration of a deep convolutional neural network, in accordance with exemplary embodiments of the present invention.
Figure 4:
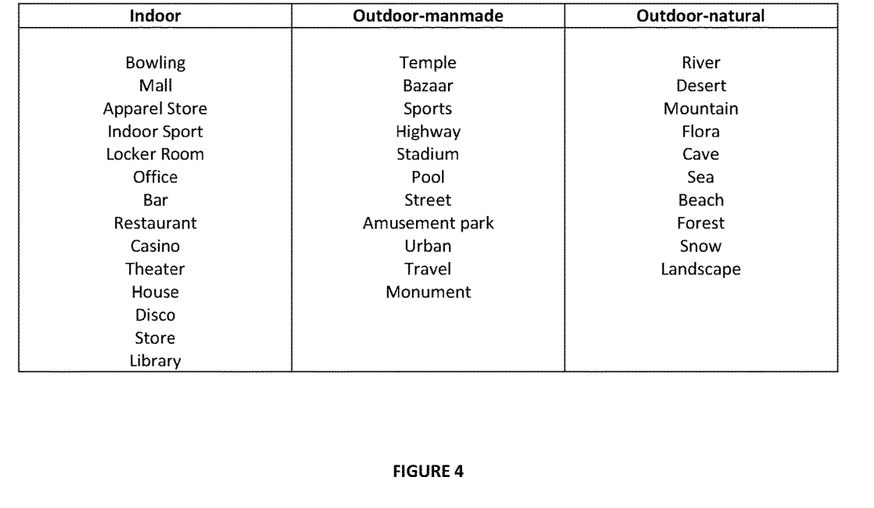
FIG. 4 illustrates an exemplary list of categories/classes, in accordance with exemplary embodiments of the present invention.

FIG. 3 illustrates an architectural representation of the configuration of a deep convolutional neural network, in accordance with exemplary embodiments of the present invention. Deep Convolutional Neural Networks are neural nets that are specifically designed to deal with 2D input data and their patterns of translation, scale and distortion variances. The DCNN is configured to perform a 2D convolution operation where the input to a neuron/node is the output of a 2D kernel operating on a local window of neurons from the previous layer. The same 2D kernel is applied throughout the layer, resulting in weights being shared by multiple connections in the network.

As shown in FIG. 3, the DCNN comprises of several types of layers such as the convolution layer, pooling layers and fully connected layers. The convolution layer is configured to perform individual convolution operations and send the output of each such operation to one or more nodes in the next layer. In a preferred embodiment, the output of the convolution operations is transferred to only some nodes in the next layer. The pooling layer is configured to perform aggregate operations like max/average over neighboring windows of outputs. The pooling layer has no weights and just aggregates values over the receptive field. A fully connected layer is the traditional layer type where each node is connected to every node in the next layer.

In addition to the backpropagation technique for training as discussed above, the DCNN networks may be trained using techniques such as rectified linear units, local response normalization, and parallelization on a GPU. In a preferred embodiment, the weight update rule is as follows:

$$v_{i+1} = 0.9 \cdot v_i - 0.0005 \cdot \epsilon \cdot w_i - \epsilon \cdot \left( \frac{\partial L}{\partial w} \bigg|_{w_i} \right) D_i$$

Wherein i is the iteration number, w is the weight vector, $D_i$ is the training data sampled for training in iteration l and v is the weight update.

In an exemplary embodiment, as shown in FIG. 3, the DCNN comprises of 5 convolution layers, 3 pooling layers and 3 fully connected layers. The input layer is configured to read/receive raw RGB data from an image and the output layer is configured to produce intermediate output categories probabilities as outputs. As shown, in a preferred embodiment, the first convolution layer has 96 kernels of size 11×11×3, second convolution layer has 256 kernels of size 5×5×96, third convolution layer has 384 kernels of size 3×3×256, fourth convolution layer has 384 kernels of size 3×3×384 and fifth convolution layer has 256 kernels of size 3×3×384. All three pooling layers use a kernel of size 3×3 with a stride of 2 and the two fully connected layers comprise of 4096 nodes/neurons each.

Figure 6:
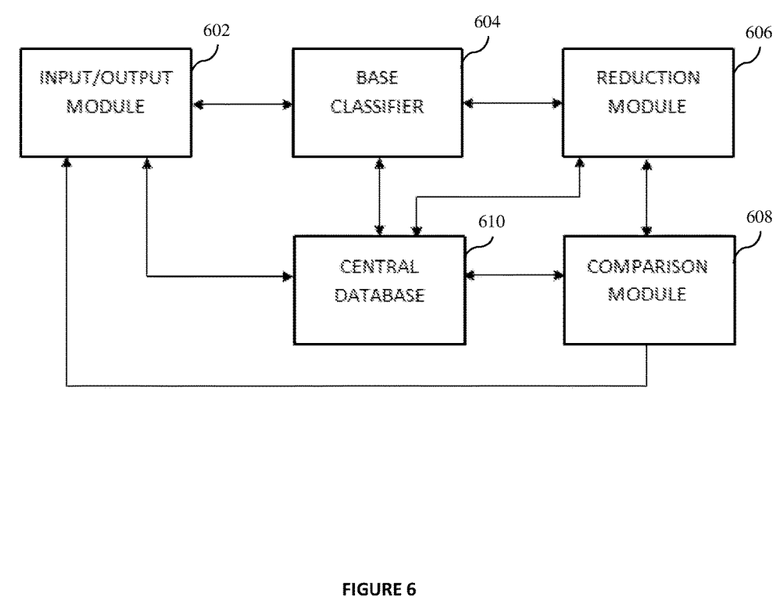
FIG. 6 illustrates a system for similarity matching, in accordance with exemplary embodiments of the present invention.

As shown in FIG. 6, the system for similarity matching, i.e. for providing images similar to an query image from within a set of images, comprises an input/output module 602 connected to a base classifier 604 further connected to a reduction module 606 and comparison module 608, all connected to a central database 610. The I/O module 602 is configured to receive a query image, wherein the query image may be received from a user input or as part of a request made by another system. The I/O module 602 is also configured to store the query image into the central database 610 and provide the same to the base classifier 604, wherein the base classifier 604 comprises of a deep convolutional neural network (DCNN). The DCNN extracts a feature vector of said query image and provides it to the reduction module 606, wherein in an embodiment the extracted feature vector is a 4096 dimensional vector. The base classifier 604 stores this extracted feature vector in the central database 610.

The reduction module 606 comprises of an auto-encoder (not shown in FIG. 6) configured to reduce the dimensionality of said feature vector to form a reduced dimensional feature vector. In an embodiment, the auto encoder converts the 4096 dimensional feature vector into 128 reduced dimensional feature vector. The auto encoder is an artificial neural network trained in a supervised error back propagation manner same as or at least substantially similar to that discussed hereinabove. The auto encoder is configured to adjust/learn a set of weights that minimize the reconstruction error, wherein reconstruction error captures the similarity between the image reconstructed from a reduced dimensional vector and the original query image. Minimizing the reconstruction error ensures that similar vectors in higher dimensional space are also similar in lower dimensional space and vice versa. In an embodiment, the auto encoder was trained with the network architecture consisting of the following sequence of dimensions: 4096-1024-512-128-32-128-512-1024.

The reduction module 606 is further configured to split the reduced dimensional feature vector into a plurality of query image segments and provide the same to the comparison module 608.

In a preferred embodiment, the reduction module 606 splits the 128 bit reduced dimensional feature vector into 16 segments of 8 bits each.

The comparison module 608 is configured to compare the query image segments with the segments of set of images stored in the central database 610 and provide images similar to said query image based on this comparison, wherein the query image itself is excluded from the set of images used for this comparison. The comparison module 608 is further configured to compare the original query image with the similar images and re-rank the similar images based on this comparison. In other words, similar images computed on the basis of the comparison using smaller reduced dimensionality feature vectors are re-ranked by the comparison module 608 based on a comparison between the feature vector of the query image and the feature vectors of the similar images.

The central database 610 is configured to store a large set of images indexed as 8 bit segments using hash tables. For every image in the set of images, the central database is configured to store a 128-bit representation of the image computed by the reduction module 606, the original 4096 dimensional feature vector of the image extracted by the base classifier 604 and the image itself. In an embodiment, the 128-bit vector is split into 16 segments of 8 bits each. The central database 610 is configured to maintain 16 hash tables, one for each segment, wherein the hash table corresponding to segment "i" uses the integer computed from those 8 bits as the hash key and the image as the value. The central database 610 is further configured to store the input query images, the feature vectors, the reduced dimensionality feature vectors, comparison results and any other data/information used or processed by the system or any modules/components thereof.

Method Overview

Figure 5:
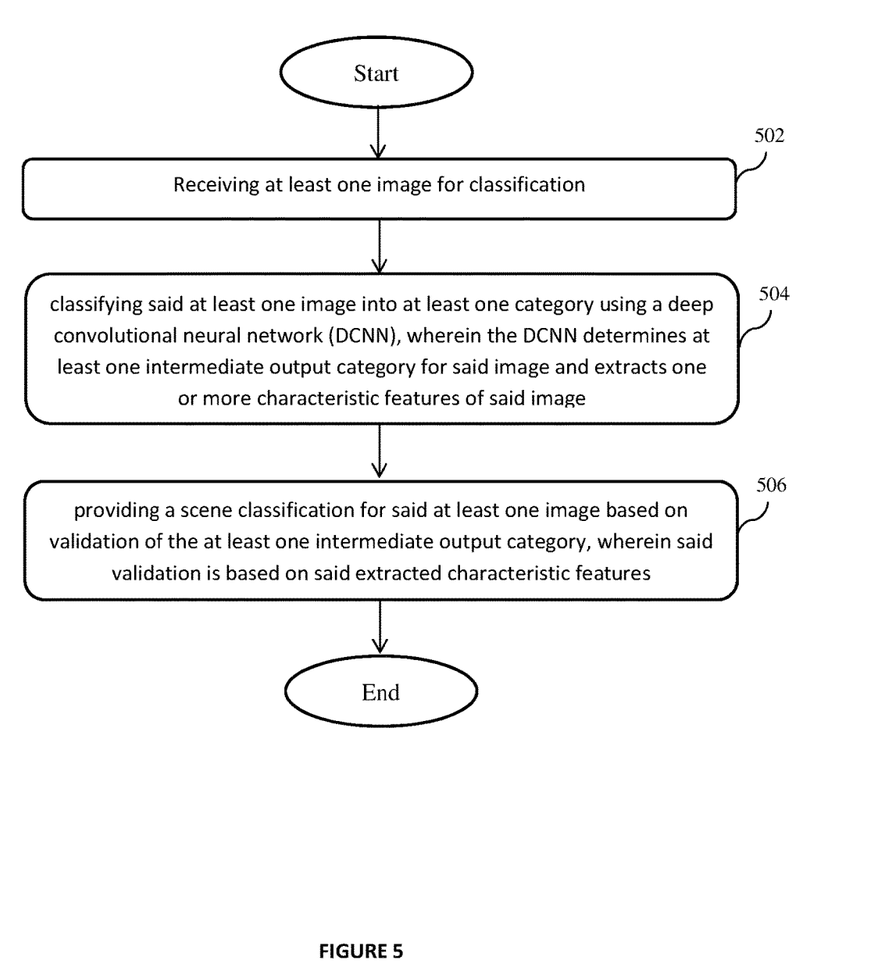
FIG. 5 illustrates a method for scene classification, in accordance with exemplary embodiments of the present invention.

As shown in FIG. 5, the method for scene classification for an image, in accordance with example embodiments of the present invention begins at step 502, wherein at least one image is received for classification pursuant to which it is pre-processed to alter the size, dimensionality of the image, extract the RGB data from said image, etc. Next, at step 504, the received and/or pre-processed image is classified into at least one category using a deep convolutional neural network (DCNN), wherein the DCNN determines at least one intermediate output category for said image and extracts one or more characteristic features of said image. Extracting one or more characteristic features of said image includes extracting characteristic features from a fully connected layer of the DCNN. Determining an intermediate output category includes passing the input image to the DCNN, computing features in each layer of said DCNN and propagating said features to the subsequent layers of the DCNN, at least one non-linear transformation of the received image is computed during this step.

Subsequently, at step 506, the intermediate output category determined at step 504 is validated based on the extracted characteristic features. Validating the intermediate output category includes passing the characteristics features of the image as an input to the binary classifier, wherein if the binary classifier returns a positive output then the scene classification for the input image is the same as the predicted intermediate output category, otherwise the scene classification for the input image is 'none of the pre-defined scene classes'. Based on said validation a scene classification is provided for said image.

The method also encompasses reducing overfitting during the process of scene classification, wherein the overfitting may be reduced by performing data augmentation by replicating data/images through the introduction of small variations and augmenting this to the training dataset. In an embodiment, data augmentation is performed by extracting multiple patches of 227×227 from the training image of 256×256. In another embodiment, data augmentation is performed by performing PCA on R, G, B pixel values over the training data for each pixel and extracting the top 16 principal components. Subsequently, these components are multiplied with a random small factor and the weighed principal components are added to each image to get more replications. The invention also encompasses reducing overfitting by dropping the inputs from certain randomly chosen nodes during training. In an embodiment, when an image is processed, the outputs of all neurons are taken in but they are multiplied with a factor to account for dropout, for instance if 50% of the inputs are dropped out, the outputs of all neurons are multiplied with a factor of 0.5 to weigh their contributions in the training process. The method also encompasses reducing overfitting by early termination wherein the learning rate is dropped by a factor of 10 whenever the training error increases or is constant for a sustained number of iterations.

Figure 7:
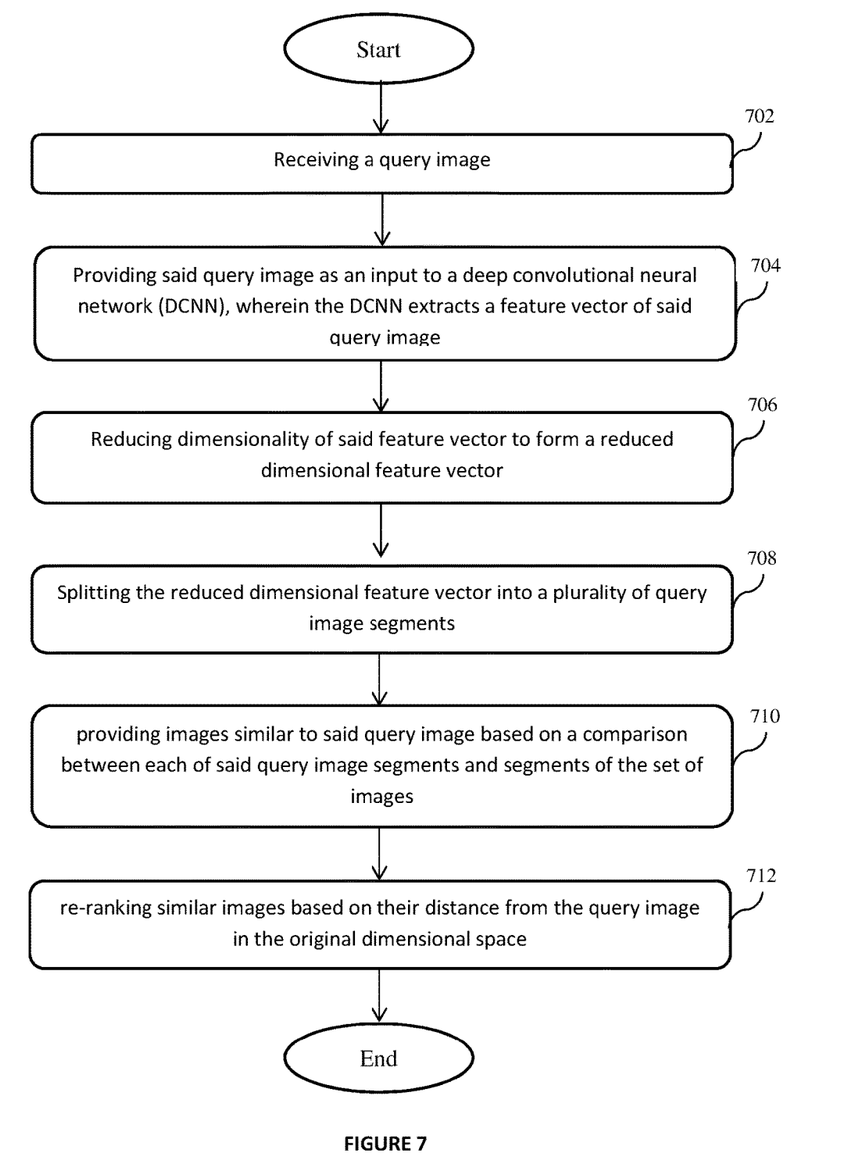
FIG. 7 illustrates a method for similarity matching, in accordance with exemplary embodiments of the present invention.

As shown in FIG. 7, the method for providing images similar to a query image from within a set of images, in accordance with example embodiments of the invention, begins with receiving a query image at step 702. Next, at step 704, the received input query image is provided as an input to a deep convolutional neural network (DCNN), wherein the DCNN extracts a feature vector of said query image. In an embodiment, the extracted feature vector is an output of a fully connected layer of the DCNN.

At step 706, the dimensionality of said feature vector is reduced to form a reduced dimensional feature vector. The invention encompasses reducing dimensionality by providing the feature vector extracted by the DCNN as an input to the Deep Belief Network (DBN), wherein the DBN comprises layer-wise Restricted Boltzmann Machines (RBM). In an embodiment, the layer-wise RBMs are built for the following configurations: 4096 to 1024, 1024 to 512, 512 to 128 and 128 to 32 dimensions and are trained through contrastive divergence approach. The invention also encompasses reducing dimensionality by providing the feature vector as an input to an auto encoder artificial neural network, wherein the auto encoder converts the feature vector into a reduced dimensionality feature vector.

As discussed in the system overview, the invention encompasses use of a hashing scheme to index all the images stored in the database, i.e. the set of images within which similarity search is to be performed. Each image stored in the database is split into 16 segments of 8-bits, wherein each segment is stored in a hash table. At step 708, the reduced dimensional feature vector of the query image is also split/divided into a plurality of segments, preferably into 16 segments of 8-bits each, and each such segment is provided to one of the 16 hash tables. Subsequently, such query image segments are compared with segments of the set of images at step 710. Comparing query image segments with segments of set of images includes providing each segment to one node, wherein each node looks up its specific hash table and returns images matching the 8 bit segment that was sent to that node.

Step 710 provides images similar to said query image based on this comparison, wherein similar images are those for which the distance from the query image is less than a pre-defined threshold.

At step 712, the similar images computed in the above step are then re-ranked based on their distance from the query image in the original dimensional space. In an embodiment, hamming distance is used as a distance measure. This distance search is first performed in the reduced dimensional space (such as 128 bit dimensional space) and then the obtained results are re-ranked according to the distances in the original dimensional space (such as the 4096 bit dimensional space).

The disclosed methods and systems may be implemented on a Graphics Processing Unit (GPU). In an embodiment, the systems are implemented on NVIDIA Tesla M2070 GPU card with 2880 CUDA cores, an Intel Xeon X5675 CPU and 5375 MB of Video RAM.

While various embodiments of the image processing methods and systems have been disclosed, it should be apparent to those skilled in the art many more modifications, besides those described, are possible without departing from the inventive concepts herein. The embodiments, therefore, are not to be restricted. Moreover, in interpreting the disclosure, all terms should be understood in the broadest possible manner consistent with the context. It will be appreciated by those skilled in the art that any of the aforementioned steps and/or system modules may be suitably replaced, reordered, or removed, and additional steps and/or system modules may be inserted. Further, the invention encompasses embodiments for hardware, software, or a combination thereof.

We claim:

1. A method of performing scene classification of an image, the method comprising:
   receiving an image into a deep convolutional neural network (DCNN) comprising multiple layers, each layer having multiple nodes, the DCNN having been customized with adjusted weights at each layer;
   classifying, by the DCNN, based on the adjusted weights, the image into one or more intermediate output categories, the intermediate output categories being chosen from a set of pre-defined output categories, each of the pre-defined output categories being associated with a separate corresponding binary classifier and a separate corresponding scene classification;
   extracting, by the DCNN, based on the adjusted weights, one or more characteristic features of the image; and
   further classifying the image using at least the binary classifiers associated with the one or more intermediate output categories, based on the one or more characteristic features of the image, into the scene classifications corresponding to the one or more intermediate output categories or into a category that is not associated with any of the pre-defined output categories.

2. The method of claim 1 wherein determining the one or more intermediate output categories includes computing at least one non-linear transformation of the received image.

3. The method of claim 1 wherein the one or more intermediate output categories determined by the DCNN are one of an indoor category, an outdoor category and a combination thereof.

4. The method of claim 1 wherein the DCNN comprises at least one convolution layer, a pooling layer and a fully connected layer.

5. The method of claim 1 wherein the one or more characteristic features of said image extracted by the DCNN are an output of a first fully connected layer of the DCNN.

6. The method of claim 1, wherein the image is classified into more than one intermediate output category.

7. The method of claim 1, wherein the image is classified into only one intermediate output category.

8. A system for scene classification of an image, the system comprising:
   a receiver unit for receiving an image;
   a base classifier, associated with said receiver unit, wherein the base classifier comprises a deep convolutional neural network (DCNN) comprising multiple layers, each layer having multiple nodes, the DCNN having been customized with adjusted weights at each layer, and wherein the DCNN, based on the adjusted weights, extracts one or more characteristic features of said image and classifies the image into one or more intermediate output categories, the intermediate output categories being chosen from a set of pre-defined output categories, each of the pre-defined output categories being associated with a separate scene classification; and
   a set of binary classifiers associated with the base classifier, each binary classifier being associated with a separate pre-defined output category of the set of pre-defined output categories, for further classifying the image, based on the one or more characteristic features of the image, into the scene classifications corresponding to the one or more intermediate output categories or into a category that is not associated with any of the pre-defined output categories.

9. The system of claim 8 wherein the binary classifiers are be a Support Vector Machine.

* * * * *